United States Patent [19]

Stahl

[11] 4,259,139
[45] Mar. 31, 1981

[54] METHOD AND APPARATUS FOR PRODUCING A REINFORCED PLASTIC PIPE

[75] Inventor: Eugen H. Stahl, Böttingen, Fed. Rep. of Germany

[73] Assignee: Hans Grobe GmbH & Co. KG, Fed. Rep. of Germany

[21] Appl. No.: 37,375

[22] Filed: May 9, 1979

[30] Foreign Application Priority Data

May 12, 1978 [DE] Fed. Rep. of Germany ....... 2820750

[51] Int. Cl.³ ...................... B31C 81/00; B65N 81/00; B29B 7/14; B29C 17/00
[52] U.S. Cl. .................................. 156/428; 156/425; 156/500; 156/143; 156/187
[58] Field of Search ............... 156/143, 149, 187, 188, 156/198, 425, 428, 429, 430, 431, 432, 500

[56] References Cited

U.S. PATENT DOCUMENTS

| 2,637,674 | 5/1953 | Stahl | 156/194 |
|---|---|---|---|
| 2,798,508 | 7/1957 | Kahn | 156/143 |
| 2,874,728 | 2/1959 | Kahn | 156/143 |
| 4,180,429 | 12/1979 | Alber | 156/425 |

FOREIGN PATENT DOCUMENTS

1046962 12/1958 Fed. Rep. of Germany .
6607775 11/1970 Fed. Rep. of Germany .
1629819 1/1971 Fed. Rep. of Germany .
1435237 10/1973 Fed. Rep. of Germany .
2502363 7/1976 Fed. Rep. of Germany .

*Primary Examiner*—John T. Goolkasian
*Assistant Examiner*—Louis Falasco
*Attorney, Agent, or Firm*—McGlew and Tuttle

[57] ABSTRACT

A reinforced plastic pipe is produced by feeding a plastic tube along a feed path while directing a reinforcement strip into a path around a tube so as to wind it into spiral coils which are spaced radially outwardly of the tube and including subsequently pushing the coils in an axial direction while deflecting them inwardly to cause their diameters to be reduced so that they engage around the surface of the tube. The tube is advantageously fed directly from an extruder in a tacky state so that the reinforcement strip will be immediately bound to the surface when it is directed into engagement therewith. The apparatus for carrying out the method includes a thin tubular mandrel disposed around the tube which is formed by an extruder and a winding device is associated with a reel supply of the reinforcement strip so as to feed it around the mandrel. A cam device is then applied around the mandrel to successively force the coils, after they have been formed into groups, off the mandrel in the same direction of feed as the newly formed plastic tube.

15 Claims, 10 Drawing Figures

METHOD AND APPARATUS FOR PRODUCING A REINFORCED PLASTIC PIPE

FIELD AND BACKGROUND OF THE INVENTION

This invention relates to tube or pipe construction in general and, in particular, to a new and useful apparatus and process for the production of a plastic tube provided with a ribbon- or wire-type reinforcement spiral, comprising, a relatively hard, in particular, a thermoplastic or elastomeric material, wherein, the reinforcement spiral is wound onto a relatively soft inner tube and is physically joined therewith.

DESCRIPTION OF THE PRIOR ART

For the production of such plastic tubes, two basically different processes or working methods are known up to the present time. In the one basic process, a supply drum, on which the material resulting in the reinforcement spiral is wound, is revolved around a winding mandrel and, in so doing, the reinforcement spiral is unwound from the supply drum in proportion as it is being wound on the winding mandrel, or on the tube enveloping the winding mandrel. In a process of this kind which serves for the production of a tube which consists of an inner support spiral, an outer support spiral, and a plastic tube shell lying sinusoidally embedded between these two spirals, the tube shell is applied on a mandrel provided with a support spiral and is subsequently wrapped with an outer spiral. The mandrel provided with the support spiral is moved in an axial direction through the interior of a die of an extrusion press and, in so doing, the plastic tube is molded around the support spiral and the outer spiral is wound around the tube directly thereon.

The gyratory motion with which the supply drum of the support or reinforcement spiral material must be moved around the winding mandrel requires a complicated machine setup, as well as measures for compensating the occurring imbalance. In addition, the winding speed is limited to a relatively low value, and the size of the material supply on the supply spool is limited to a relatively low value because of the occurring weight differences between a full and an empty supply drum. In addition the winding mandrel moving through the extrusion press die is likewise limited in its length and must in the end be removed again from the finished tube, therefore, only relatively short tube lengths can be produced in one piece.

In the other basic process the winding mandrel with the tube forming thereon is continuously rotated about its own axis and, in so doing, the reinforcement spiral is wound onto the winding mandrel or the tube forming on the winding mandrel. See West German Patent Appln. Nos. AS 1,046,962 and OS 1,629,819, West German Utility Model 6,607,775, and U.S. Pat. Nos. 2,874,723 and 2,798,508.

In this process, it is not necessary to let the supply drum circle around the winding mandrel, but it has other disadvantages. Apart from the fact that with this procedure only certain relatively short lengths of tubes in one piece can be produced, it is either necessary to produce the inner tube separately and to draw it onto the winding mandrel first, or the tube wall must be made of band material which is spirally wound onto the mandrel with overlap and is welded at the same time. Production of the inner tube by extruding or in the extrusion press is not possible in this case.

SUMMARY OF THE INVENTION

It is the object of the present invention to provide a process and an apparatus for the production of a plastic tube which makes it possible to produce tubes of any desired length in a continuous operation without the necessity of using either a revolving winding mandrel or a supply drum circling around the winding mandrel, but with which it is possible, above all, to apply the reinforcement spiral from a stationary supply drum onto the extruded inner tube without the latter rotating about its own axis and without it being provided with a mandrel at the point of application.

This is achieved, according to the invention, by first prewinding the reinforcement spiral continuously concentric with an inner tube to form the reinforcement in the manner of a helical spring and with an inside diameter which is greater than the final dimension thereof. The prewound turns of the reinforcement spiral are continuously pushed, with simultaneous diameter reduction, in an axial feed movement onto the inner tube moving axially in the same direction.

With this process, it is theoretically possible to provide, in an operation of unlimited duration, an extruded inner tube of unlimited length with a reinforcement spiral. Apart from any functional disturbances, interruption of this operation is necessary only when the reinforcement spiral supply or the extruded inner tube expires.

Expediently, the application of the prewound turns of the reinforcement spiral on the inner tube occurs in the immediate vicinity of an extruder die extruding the inner tube.

In order to obtain a good physical connection between the inner tube and the reinforcement spiral in a simple manner, the prewound turns of the reinforcement spiral are expediently heated before their application on the inner tube, at least at their inner faces, to a temperature which corresponds at least approximately to the melting or welding temperature. Alternatively, the prewound turns of the reinforcement band may be provided with an adhesive or welding agent on their inner face before they come in contact with the inner tube.

In practice, it has proven to be advantageous if the prewinding of the reinforcement spiral occurs to an inside diameter which is about one-fifth to one-tenth larger than the finished outside diameter of the inner tube.

In particular, in the case of a ribbon-type reinforcement spiral, the axial advance of the prewound turns of the reinforcement spiral can be facilitated in that the turns are prewound lying close together.

According to the invention, the apparatus provided for the practice of the above-described process is characterized in that concentric with a fixed hollow prewinding mandrel which is concentrically traversed by the inner tube, a winding apparatus is arranged which is drivable in continuous rotation and is provided with eccentrically arranged radial guide and transport rollers, as well as with axial feed elements for the reinforcement spiral, and includes a reducing sleeve, with the reducing sleeve having an axial bore conically tapering in the direction of movement of the inner tube from the outer prewinding diameter of the reinforcement spiral to the finished outside diameter of the reinforcement spiral.

The main advantage of this arrangement is that the prewinding mandrel is not located in the interior of the inner tube, but is arranged so that it concentrically surrounds the inner tube and the prewinding mandrel can be limited in its axial length to some few turns of the prewound reinforcement spiral, so that these turns can be displaced easily, i.e., without great frictional resistance in an axial direction, and that, therefore, the winding of the ribbon-type or wire-type material resulting in the reinforcement spiral can always be effected at the same axial point. This means that all parts needed for the practice of the process, while being movable, can also be arranged fixed, whereas, an axial movement is only carried out by the wound support spiral and by the inner tube.

While for the continuous feed of ribbon- or wire-type support spiral skein to the winding apparatus, it would also be possible to let the supply drum, with the revolving winding device, circle about the axis of the prewinding mandrel in a known manner, in a further development of the apparatus according to the invention, it is provided that, coaxially with the prewinding mandrel, a rotatably mounted supply drum is arranged, on which the reinforcement spiral supply to be processed is wound. This arrangement of the supply drum has the very important advantage that it must be rotatable exclusively about its own axis, permitting a much simpler suspension as compared with a circling arrangement.

By the suspension of the supply drum on the cylindrical hollow body of a drum bearing which, in turn, is driven rotating about its own axis at the winding speed and in the winding direction and which is in non-rotational connection with the winding device, the supply drum is, in practical operation, rotated synchronously with the winding device, but without being in connection with a fixed drive. By this synchronization between the supply drum and the winding device which is achieved exclusively through bearing friction, the advantage obtained is that the unwinding of the reinforcement spiral skein from the supply drum and the feeding thereof to the prewinding mandrel can occur with the least possible torque and, hence, with the least possible tensile stress, because only the tensile forces are required which are necessary to generate the lead of the supply drum relative to the winding device and which results from the difference in length between a prewound turn and the turn just then present on the supply drum and being unwound.

Accordingly, an object of the present invention is to provide a method for producing reinforced plastic pipe which comprises feeding a plastic tube along a feed path, preferably while the tube has a surface which is in a sticky or tacky state, and directing a relatively hard reinforcement strip into a path so that it is wound around the tube in a spiral to form axially closely spaced coils disposed around, and radially outwardly of the tube, subsequently pushing the coils in an axial direction by causing their diameter to be reduced so that the interior of the coil engages the surface of the tube and bonding the coils to the surface of the tube as they are engaged therewith to form the reinforced pipe.

A further object of the invention is to provide a device for producing reinforced plastic pipe which comprises a tubular reinforcement coil mandrel and with tube feeding means for feeding a plastic tube with an exterior tube contact surface in a direction axially of the tube and through the mandrel and further including reinforcing strip supply means having a reinforcing strip with a strip contact surface associated with reinforcement strip winding means for winding the reinforcement from said coil supply around said mandrel, movement means engageable with the coils as they are formed to move them axially off said mandrel in the direction of movement of the plastic tube, and reinforcement attachment means engageable with the coils moved off the mandrel to force them in a direction to move the strip contact surface into engagement with said tube contact surface and to cause said strip coils to be bound with said tube, at least one of said strip and said tube contact surfaces being of a nature such that they become bound to each other when moved into interengagement.

Another object of the present invention is to provide an apparatus for producing reinforced plastic pipe which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Referring to the drawings in particular, the invention embodied therein, comprises, a device and method for producing a reinforced plastic pipe, which includes a central tubular part 45 with an exterior reinforcement 46 in the form of a continuous coil around the periphery of the pipe.

Figure 1:
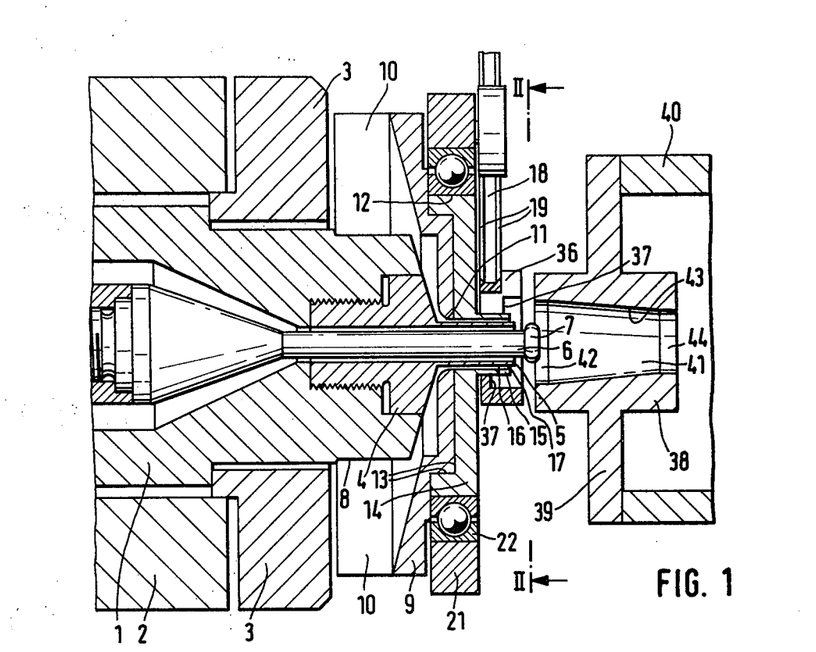
FIG. 1 is a partial sectional view of a device for forming a reinforced plastic tube constructed in accordance with the invention.
Figure 2:
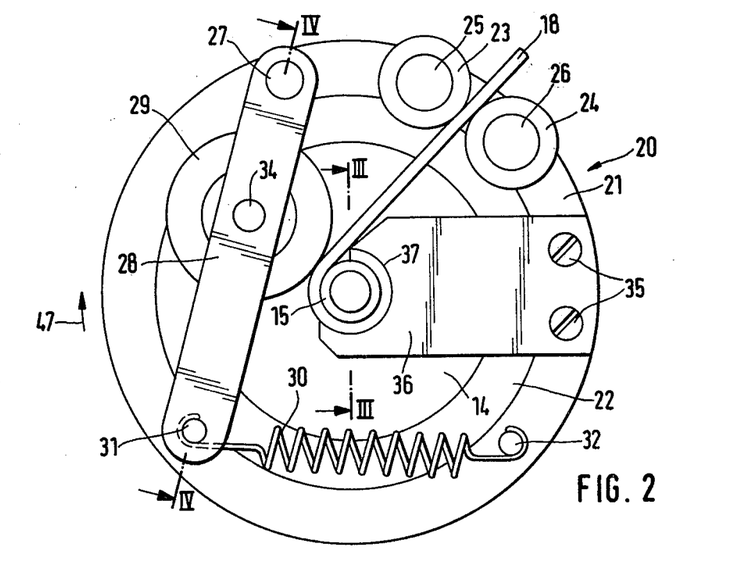
FIG. 2 is a section taken along the line II—II of FIG. 1.
Figure 3:
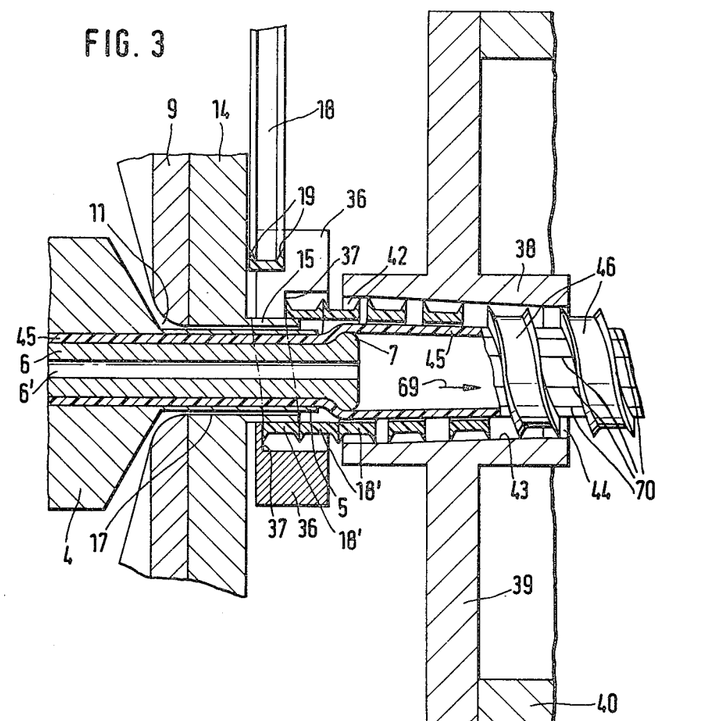
FIG. 3 is an enlarged detail of FIG. 1 showing the reinforcement strip already formed into coils around the mandrel moved off into contact with the surface of the tube.
Figures 5, 6:
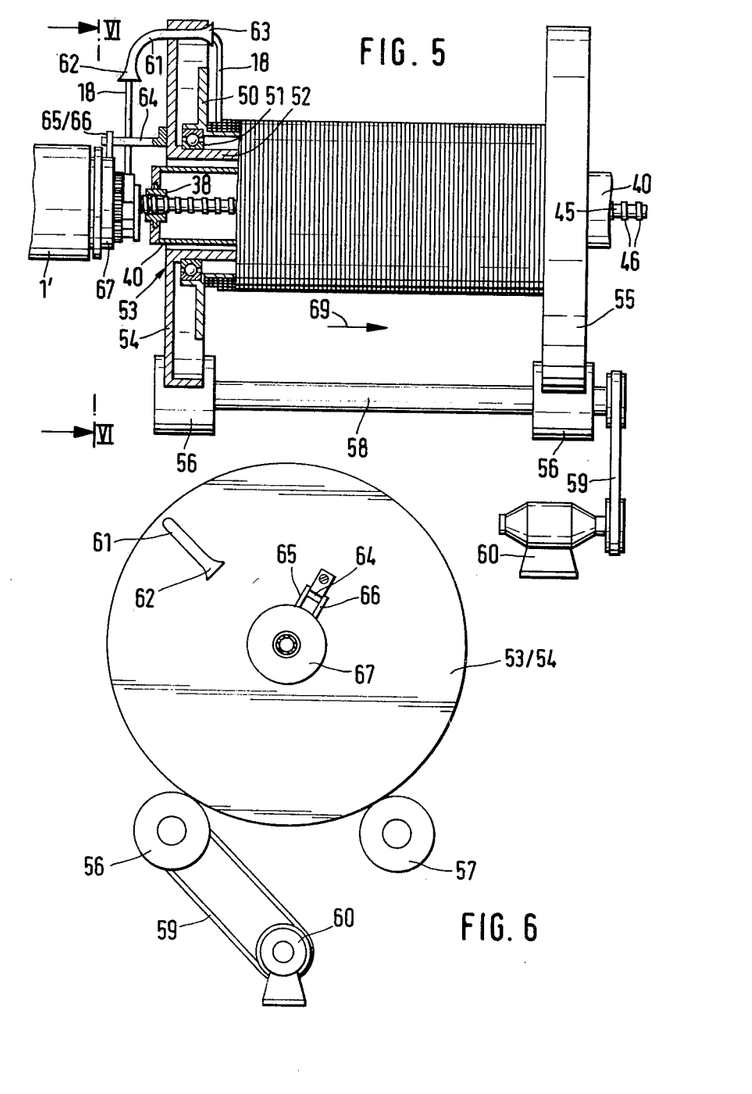
FIG. 5 is an axial view, similar to FIG. 1, but showing a reel supply for the reinforcement strip and the unwinding mechanism therefor.
FIG. 6 is a section taken along the line VI—VI of FIG. 5.

In accordance with the inventiion, a tubular mandrel 15 is provided for winding coils of a reinforcement strip 18 which is fed off a reel supply of supply drum 50, as shown in FIG. 5 and between feed rollers 25 and 26 of a drivable winding device, generally designated 20, as shown in FIG. 2. After the coils are wound around the mandrel, they are pushed off the mandrel by a cam device 37, as shown in FIG. 2, and are passed through a bevelled tubular guide 38, as shown in FIGS. 1 and 3, so as to move them axially in the direction of a newly formed tube 45 and then radially into engagement with the surface of the newly formed tube or binding to the tube. A hot plastic material is advantageously in reinforcement strip 18 and the tube 45 is advantageously extruded so that it is in a tacky state. Either one or both of the contact surfaces of the strip 18 and the tube 45 may be conditioned for immediate bonding of the two together when they are forced into engagement by the guide 38. For this purpose, the extruded tube may still be in a tacky state and, in addition, the reinforcement strip may also be reheated and/or a strip may be applied entirely by adhesive placed between the two or with only one of the contact surfaces being conditioned so as to cause adhesive bonding.

In accordance with the process of the invention, and in order to make a plastic tube where a reinforcement spiral is wound on an inner tube, two devices are shown in the drawings which operate on like principles, but are different in design. The similar device is evident from FIGS. 1 to 4 in conjunction with FIGS. 5 and 6, while the second form of construction is shown in FIGS. 7 to 10, again in conjunction with FIGS. 5 and 6.

Both forms are adapted to carry out the application of the reinforcement spiral on an inner plastic tube directly during extrusion of the inner tube; this having the great advantage in terms of manufacture that the melting heat required in extruding can be used also to warm up the supplied reinforcement spiral to melting or welding temperature, in order to establish a physical union between reinforcement spiral and inner tube.

The extruder head 1, shown schematically in section in FIG. 1, which is surrounded by an annular housing 2 and is provided on the front thereof with a flange ring 3, comprises, an extruder die 4 screwed in coaxially, which terminates in a thin-walled tubular piece 5, and in which a cylindrical core 6 is located which has an enlarged bead 7 at its end. Concentric with the extruder die 4, a thread draw-in disc 9, on a cylindrical shoulder 8, is fastened by means of screws, not shown.

The disc 9 has a number of evenly distributed radial thread-guiding slits 10. Thread-guiding slits 10 all open into a concentric bore 11, the diameter of which is slightly greater than the outside diameter of the tubular piece 5 of the extruder die 4, with its inner annular edge, which is visible in FIG. 1, being rounded. A circular disc 14, provided with a corresponding cylindrical recess 13 is centered in a cylindrical projection 12 ofthe thread draw-in disc 9, concentric with the tubular piece 5 of die 4. The circular disc 14 has a tubular projection 15 on its outer front side which ends approximately in the same radial plane as the tubular piece 5 of die 4. The concentric axial bore 16 of disc 14 and of the tubular projection 15 has the same diameter as bore 11 of the thread draw-in disc 9, so that an annular gap 17 opening frontally is formed around the tubular piece 5 of die 4. Reinforcement filaments can be pulled extending axially through this annular gap which are to be fastened on the periphery of the extruded inner tube and which are drawn in through the radial thread-guiding slits 10. The tubular projection 15 serves as a prewinding mandrel for a reinforcement spiral band 18, which presents two reinforcement ribs 19 on its outer side.

In order to wind the reinforcement spiral band 18 onto the tubular projection 15, which in the following will be termed a prewinding mandrel, a winding device 20 is provided. This winding device 20 comprises an annular disc 21 which is easily mounted rotatable on the circular disc 14 by means of a ball bearing 22. On the outer front of annular disc 21, two guide rollers 23 and 24 are rotatably mounted on journals 25 and 26, between which the reinforcement spiral band 18 is passed tangentially to the prewinding mandrel 15. On a further journal 27, a pivot arm 28 is mounted, which is provided with a press-on roller 29 which presses the reinforcement spiral band 18 onto the prewinding mandrel 15. The pressing force is supplied by an extension spring 30, which is hooked in at a pin 31 of pivot arm 28 and at a pine 32 of annular disc 21.

Figure 4:
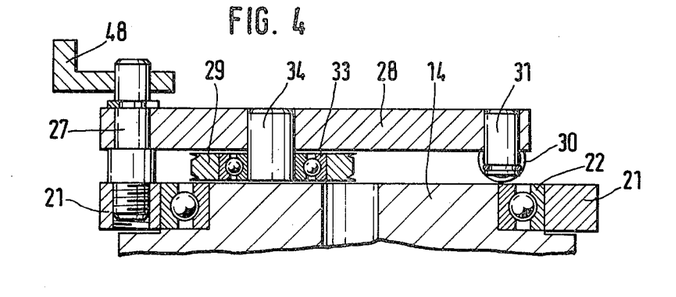
FIG. 4 is a section taken along the line IV—IV of FIG. 2.

As can be seen from FIG. 4, the generated surface profile of roller 29 is adapted to the cross-section profile of the reinforcement spiral band 18. To minimize the frictional resistance, roller 29 is mounted on journal 34 of pivot arm 28 by means of a ball bearing 33. Further, there is fastened on the annular disc 21, by means of two screws 35, a tongue-shaped plate 36 (FIG. 2) extending essentially radially, which comprises an axial cam 37 extending concentric with the prewinding mandrel 15 and covering approximately $\frac{5}{8}$ of the circumference of the prewinding mandrel 15. The function of this axial cam 37 is to displace the turns of band 18 wound on mandrel 15 continuously in an axial direction.

A reducing sleeve 38 is arranged directly adjacent to mandrel 15 or plate 36. The reducing sleeve 38 is fastened by means of an annular flange 39 to a stationary pipe 40 for the purpose of self-centering, allowing slight radial movement. In addition, reducing sleeve 38 has a centered axial bore 41 which, when viewed in the axial direction, consists of three sections 42, 43 and 44. Section 42, on the inlet side, is relatively short and cylindrical in the axial direction, with its diameter being substantially equal to the outside diameter of the turns of the reinforcement spiral band 18 wound on the prewinding mandrel 15. Section 43 is conical and tapers from the diameter of section 42 to the diameter of the likewise cylindrical section 44 of bore 41 on the exit side. The diameter of bore section 44 corresponds to the end diameter of the reinforcement spiral applied on the inner tube.

FIG. 3 shows, on a larger scale, how the turns 18' of the reinforcement spiral band 18, wound in juxtaposition on the prewinding mandrel 15 during axial passage through the reducing sleeve 38, with continual reduction of the winding diameter, undergo an increase of their winding pitch proportional to the diameter reduction, which they form upon leaving the reducing sleeve 38, when they are fastened on the extruded inner tube 45 to form the reinforcement spiral 46 thereof.

The winding of reinforcement spiral band 18 on the prewinding mandrel 15 occurs by continuous rotation of the winding device 20 in the direction of arrow 47 about the fixed prewinding mandrel 15 with simultaneous axial movement of the respective wound turns 18" through the axial cam 37 of plate 36. To avoid freezing of the respective wound turn 18" on mandrel 15, the surface of mandrel 15 is roughened or provided with an axial fluting. As can be seen from FIG. 3, the extruder 6 has an axial bore 6" through which an air stream is blow in a known manner, to prevent the collapse of the extruded inner tube 45.

The rotary drive of the annular disc 21 of winding device 20 occurs by an arrangement shown in FIGS. 5 and 6, with which the journal 27 (FIG. 4) is connected by an angle piece 48. However, the arrangement shown in FIGS. 5 and 6 not only serves to drive the winding device, but also serves to support a supply drum 50 on which the reinforcement spiral band 18 is wound in spool fashion. This supply drum 50 is mounted by means of ball bearings 51, of which only one is shown in FIG. 5, for easy rotation by itself concentric on the cylindrical hollow body 52 of a drum bearing, generally designated 53, which is arranged coaxial with the prewinding mandrel 15.

Drum bearing 53 has disc wheels 54 and 55 at its two ends, by means of which it rests on bearing or friction rollers 46 and 57, which are rotatable in pairs symmetrically with the vertical median plane of the drum bearing. The friction rollers 56 are connected together by a shaft 58 and are in gear connection with a drive motor 60 through a belt 59. The disc wheel 54, which is disposed on the frontal side of drum bearing 53 facing the winding device 20 and an extruder winding device 67, possesses an angle pipe 61 whose ends are widened in trumpet fashion as the passageway for the support spiral band 18.

One end 62 is directed radially to the winding device 67 and the other end 63 is axially aligned. The extruder head 1', shown in FIG. 5, is equipped with the winding device 67, shown specifically if FIGS. 7 to 10. On the front of disc wheel 54, a tappet arm 64 is fastened which engages between two radial tappel fingers 65 and 66 of the winding device 67. (See also FIG. 8). In this manner, the supply drum 50 is arranged coaxially with the winding mandrel 15 or the winding device 20, or with the extruder die 4, so that it can freely rotate exclusively about its own axis for the purpose of unwinding the reinforcement spiral band 18.

The pipe 40, to which the reducing sleeve 38 is secured, can, at the same time, serve as a catch bin for the cooling liquid which is sprayed directly behind the reducing sleeve 38 onto the extruded inner tube 45 already provided with a reinforcement spiral 46. Instead of liquid cooling, air cooling may of course be provided.

As can readily be seen from FIS. 1, 3, and 5, the prewinding mandrel 15, the reducing sleeve 18 and the drum bearing 53, with the supply drum 50, are arranged coaxially with one another or coaxially with the extruder die 4, and the annular disc 21 of the winding device 20 also occupies a concentric position therewith.

As can be seen in particular in FIGS. 2 and 3, the application of the reinforcement spiral 46 on the inner tube 45 in effected by winding the reinforcement spiral band 18, upon rotation of the winding device 20 in the direction of arrow 47 always in the same plane, onto the fixed prewinding mandrel 15 and, simultaneously, pushing the wound turns 18' by the axial cam 37 of plate 36. The wound turns 18' are fed continuously in an extruding direction of arrow 69 from the prewinding mandrel 15 into the reducing sleeve 38, in which, with steady diameter reduction and simultaneous pitch increase, they are applied on the inner tube 45. At the end of the reducing sleeve 38, the turns 18' assume their final diameter and are joined physically with the tube 45, due to the still prevailing welding temperature.

It is clear that the speed of rotation of the winding device for the reinforcement 20 must be in a certain ratio to the extruding speed, i.e., the transport speed of the inner tube 45 in the direction of arrow 69. In practice, this is achieved in that the drive of the friction rollers 56 for the reel supply drum 50 is in gear connection with the drive of a pulling device shown by an arrow 50' which pulls the extruded inner tube 45 with the applied reinforcement spiral 46 off the extruder die 4, and which is arranged to move in pull-off direction (arrow 69).

During extrusion of the inner tube 45, non-elastic but flexible, reinforcement filaments 70, indicated only in FIG. 3, are also drawn-in through the annular gap 17. The filaments embed themselves slightly in the generated surface of the inner tube 45 in the area of the enlargement bead 7 of core 6 of extruder die 4 and thus enter into a partially form-locking partially physical union with the inner tube 45.

During the winding of the reinforcement spiral band 18 onto the prewinding devices 20 and 67 for the reinforcement and for the extruder, respectively. This difference in speed of rotation results from the difference between the circumferential length of the prewinding mandrel 15 and the circumferential length of the turns of reinforcement elements on the supply drum 50. To obtain synchronism between the supply drum 50 and the drum bearing 53, the rotary movement of the supply drum 50 is maintained by the bearing friction, even if it is small, so that, on the section of the reinforcement spiral band 18 lying between the supply drum 50 and the prewinding mandrel 15, only the tensile stress prevails which is required for maintaining the aforementioned lead of the supply drum 50 relative to the drum bearing 53.

Figure 7:
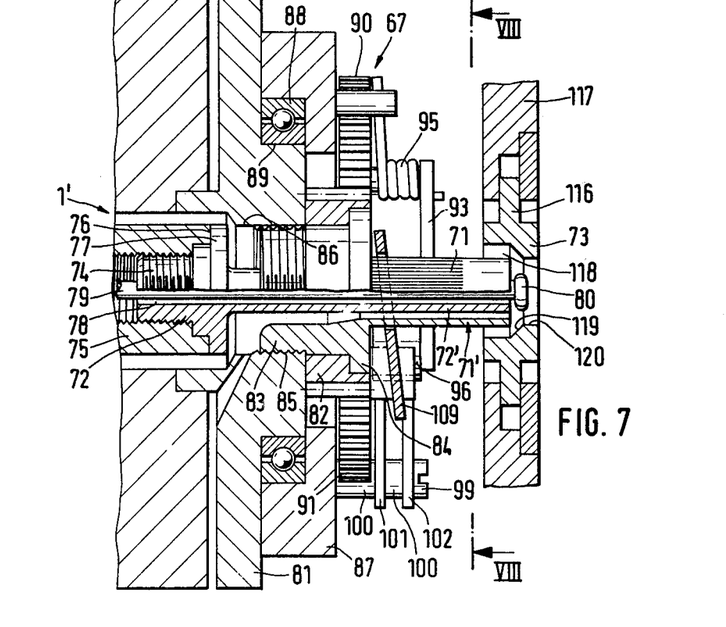
FIG. 7 is a detailed sectional view, similar to FIG. 1, showing another embodiment of the invention with a winding device for the extruder.
Figure 8:
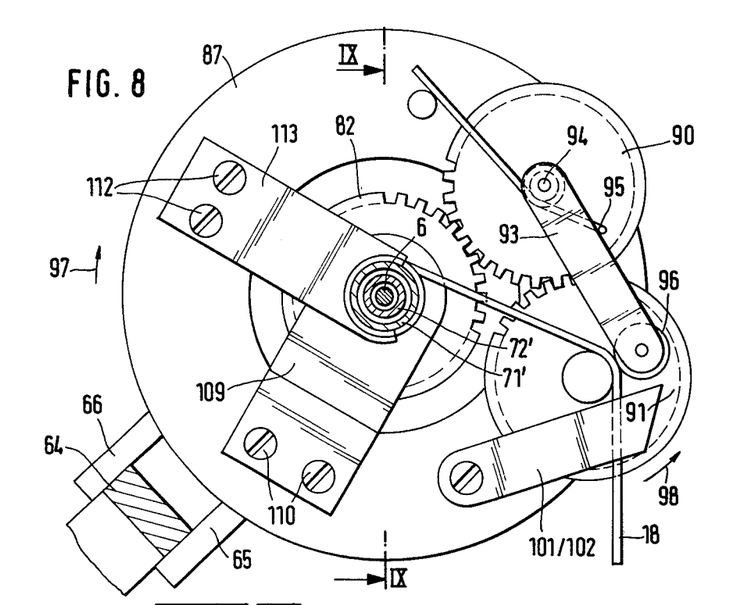
FIG. 8 is a section taken along the line VIII—VIII of FIG. 7.
Figures 9, 10:
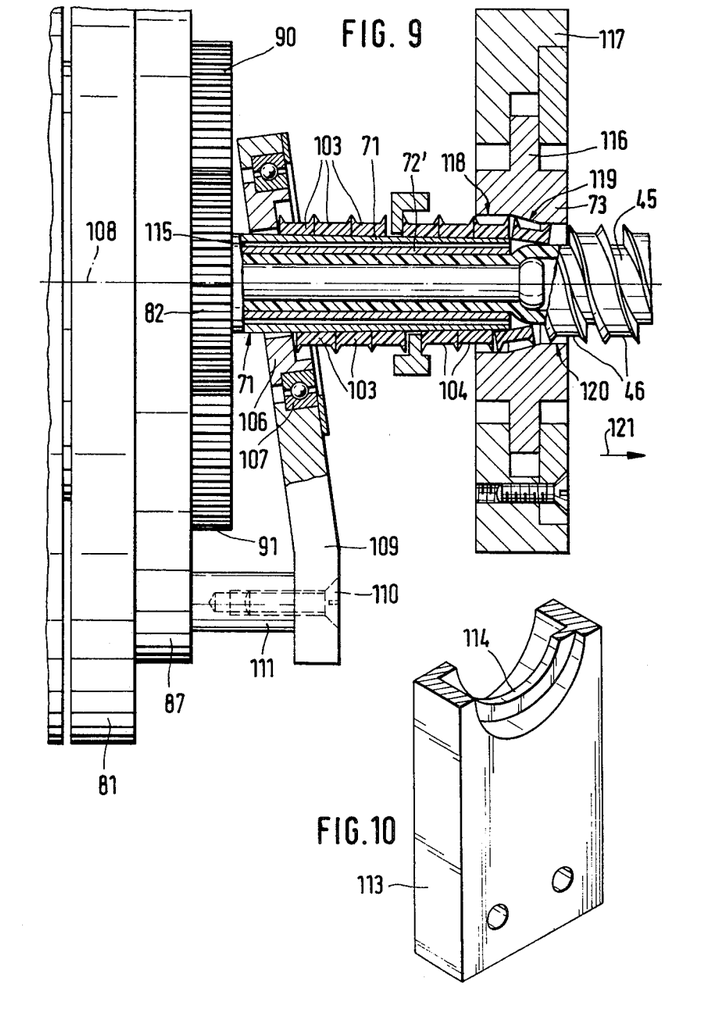
FIG. 9 is an enlarged detail of the apparatus shown in FIG. 7.
FIG. 10 is a partial sectional and partial perspective view of a part used in the embodiment of FIGS. 7, 8 and 9.

In FIGS. 7, 8 and 9, not only is an improved winding device 67 provided, but also another prewinding mandrel 71, extruder die 72 and a differently arranged and differently designed reducing sleeve 73 are provided. As can best be seen from FIG. 7, the extruder die 72 is screwed by means of a threaded projection 74 into a tubular end piece 75 of the extruder head 1', at the front 76 of which an annular flange 77 applies sealingly. The axial bore 78 contains a rod-shaped core 79, whose exit side end is provided with an enlargement bead 80.

The tubular piece 72' of extruder die 72, which is substantially longer than the tubular piece 5 of extruder die 4 in the embodiment of FIGS. 1 to 4 not only traverses a thread draw-in disc 81, arranged concentric therewith which is connected fixedly with the extruder head 1, but also a stationary gear 82, as well as the prewinding mandrel 71, which is long enough to receive about four to six closely adjacent turns of the reinforcement spiral band 18. In addition, the prewinding mandrel 71 comprises a tubular piece 71', which is formed to a hollow cylindrical flange body 83. For the centering and attachment of the gear wheel 82, the flange body 83 possesses a flange ring 84 and is screwed tightly into a bore 86 of the thread pull-in disc 81 by means of a screwthread 85. Gear wheel 82 is thereby fixedly connected with the thread pull-in disc 81 or, respectively, with the extruder head 1'.

Two gear wheels 90 and 91 are rotatably mounted on journals (not shown) on the front of an annular disc 87, which is rotatably mounted on a cylindrical projection 89 of disc 81 by means of a ball bearing 88. The gear wheels are of the same size, i.e., they have the same number of teeth, mesh, and form together with the gear 82 arranged concentrically, with the prewinding mandrel 71 comprising a simple epicyclic gearing, in which gear 90 meshes with gear 82 constituting the sun wheel of the planetary gearing.

Gear 90 only seves as an intermediate wheel for reversal of the direction of rotation of gear 91. Gear 91 is provided on its free front with a cylindrical pin 92, whose generated surface is roughened or respectively provided with an axial knurl. A press-on roller 96 is mounted on a pivot arm 93, which is pivotably mounted on a cylindrical projection 94 of the journal of gear 90 and is pressed radially against the pin 92 by means of a spiral spring 95. Pressing roller 96 presses the reinforcement spiral band 8 (sic) guided over pin 92 firmly against the latter.

The diameter of pin 92 is selected so that, as the planetary wheel 91 revolves about the axis of the sun wheel 82 in the direction of arrow 97 through the simultaneous rotation of the gear or planetary wheel 91 in the direction of arrow 98, reinforcement spiral band 18 is moved just as much up by pin 92, i.e., it is drawn off the supply drum 50, as is needed for the formation of a complete turn on the prewinding mandrel 71 or 71'.

For the lateral guidance of the reinforcement spiral band 18, two guide tabs 101 and 102 are provided which are fastened with a common screw 99 on a post 100, with a spacing corresponding to the width of the reinforcement spiral band 18, between which band 18 passes. See in particular FIG. 8. Due to this pin 92 serving as a drive roller, which is driven through the planetary gearing 82, 90 and 91, the advantageous result is that the tensile stress which is required for the unwinding of the reinforcement spiral band 18 from the supply drum 50 has no effect on the turns which are wound on the prewinding mandrel 71, so that as a whole, they can be shifted more easily in an axial direction on the prewinding mandrel 71.

For the axial displacement of the turns 103 and 104, wound on the winding mandrel 71 or 71', two different feed drives are provided which are arranged axially spaced from each other. The one feed device consists of an annular disc 106, which, by means of a ball bearing 107 is rotatably mounted in a holder 109 in a plane set at an angle to the axis 108 of the prewinding mandrel. Holder 109 is fastened on the annular disc 87 by means of two screws 110 and a spacer 111. The slant of the annular disc 106 corresponds to one-half the pitch angle of the turns 103.

The second feed device, which is similar to the plate 36 of the embodiment of FIGS. 1 to 4, consists of a tongue 113 fastened on the annular disc 87 by means of a spacer (not shown) and by means of two screws 112. The tongue 113 is shown in FIG. 10 as a separate part and presents an axial curve 114 extending concentrically with the prewinding mandrel 71 and 71', with the curve embracing a little more than half of the circumference of the prewinding mandrel 71, 71'.

As in the embodiment of FIGS. 1 to 4, an annular gap 115 also exists in this embodiment between the tubular piece 71' forming the prewinding mandrel 71 and the tubular piece 72' of the extruder die 72. Axial reinforcement filaments (not shown) can be applied on the extruded inner tube 45 through gap 115, with the filaments then being enclosed by the reinforcement spiral 46, as in the embodiment of FIG. 3.

The reducing sleeve 73, whose axial length corresponds to about two and a half times the width of the reinforcement spiral band 18, is mounted or axial movement in a holding ring 117 by means of an outer annular flange 116 in such a way that it can center itself relative to the turns 104 of band 18 traversing said sleeve and can still be partially guided on the prewinding mandrel 71. The centered bore of the reducing sleeve 73 is subdivided into three sections 118, 119 and 120, having different diameters. The diameter of the inlet side section 118 corresponds to the outer diameter of the turns 104, while the diameter of the outlet side bore section 120 corresponds to the outside diameter of the finished reinforcement spiral 45, reduced to the final dimension.

The central conical section, which begins at least approximately in the common discharge plane of the tubular piece 72' and of the extruder die 72 and the tubular piece 71' of the prewinding mandrel 71, and which has an axial length which approximately corresponds to ¾ of the width of the reinforcement sprial band, bridges the two different inlet and outlet side bore diameters in conical form. It is thereby ensured that the turns 104 of the reinforcement spiral band 18, when they leave the prewinding mandrel 70 in the course of their axial advance, are immediately thereafter brought to the diminished final diameter and, at the same time, into connection with the outer shell of the extruded inner tube 45, with the reduction of the turn diameter causing the increased turn pitch, so that the individual turns no longer lie adjacent to each other, but have the desired distance from each other, as shown in FIG. 9.

By the selected length of the two tubular pieces 72' ending in the same plane and of the extruder die on the one hand and 71' of the prewinding mandrel on the other, it is ensured that the inner face of the wound reinforcement spiral band warms up sufficiently, i.e., to the melting or welding temperature, so that a welding process immediately takes place when a turn 104 and the extruded inner tube 45 make contact.

Because of the axial length of the prewinding mandrel or, respectively, because of the plurality of turns wound on the prewinding mandrel, it is advantageous, despite the slightly conical generated surface of the prewinding mandrel 71, to provide two feed devices in the manner described. As can be seen from FIG. 9, the first 2½ or 3 turns 103 are then transported by the inclined annular disc 106 and the preceding turns 104 by the axial curve (cam) 114. The rotating drive of the winding device 67, i.e., of the annular disc 87 in the direction of arrow 97 occurs, as has been mentioned before, by the drum bearing 53 (FIG. 5) through the tappet fingers 64, 65 and 66. The axial feed of the wound turns 103 and 104 then occurs in the manner that the adjacent turns are moved on with each revolution of the winding device 67 by one turn, i.e., by one reinforcement spiral band width in the extruding direction of part 121.

Although the process of the invention can probably be used most advantageously in direct connection with the extruding of the inner tube, it is readily possible to provide a previously produced inner tube with a reinforcement spiral in an analogous manner and with a winding apparatus of the same or similar construction in principle. It is immaterial in principle what cross-sectional from the reinforcement spiral has, whether it is rectangular, found, U-shaped or otherwise formed. By appropriate heating of the tube surface, as well as of the inner face of the spiral turns, welding between the reinforcement spiral and inner tube can also be obtained thereby. That in processing a narrower support spiral a shorter prewinding mandrel may result lies in the nature of the thing.

It is also conceivable to provide the inner face of the wound turns with an adhesive, which could be applied, for example, at the end of the prewinding mandrel through appropriate radial openings an an adhesive supply through the cavity of the prewinding mandrel. For such adhesive supply, the annular gap 115 could be used, for example.

While specific embodiments of the invention have been shown and described in detail to illustrate the application of the principles of the invention, it will be understood that the invention may be embodied otherwise without departing from such principles.

What is claimed is:

1. An apparatus for producing a reinforced plastic pipe of the type having a reinforcement spirally mounted on a tube comprising a tubular reinforcement coil mandrel, means for feeding a tube with an exterior contact surface in a direction axially through said mandrel, reinforcement strip supply means having a reinforcement strip with a strip contact surface, a rotatable disc mounted for rotation around said coil mandrel including directing means for directing the reinforcement strip around said tube into coils formed around said coil mandrel, movement means engageable with said coils as they are formed for moving said coils axially off said coil mandrel about the tube and in the direction of the movement of said tube, and a reducing sleeve mounted adjacent to said coil mandrel engageable with the coils moved off said coil mandrel to force them in a direction to move the strip contact surface into engagement with the tube contact surface and to cause the coils to be engaged with the tube, said reducing sleeve having an interior bore tapered inwardly in the direction of movement of said tube so as to deflect the coils inwardly into engagement with said tube.

2. Apparatus for producing a reinforced plastic pipe, as claimed in claim 1, further comprising a cam member engageable behind coils of reinforcement material to shift it axially, said cam being mounted in a fixed position to said rotatable disc and having a portion extending around said mandrel with a pitch extending in an axial direction so as to cause the movement of the coil during the feeding of the strip.

3. Apparatus for producing a reinforced plastic pipe, as claimed in claim 1, wherein said rotatable disc includes an axially extending cam plate disposed around said mandrel, and wherein said rotatable disc comprises a planar ring disc embracing said mandrel with an axis which forms an angle with the mandrel axis corresponding to the pitch angle of the prewound reinforcement strip coils.

4. Apparatus for producing a reinforced plastic pipe, as claimed in claim 1, wherein said directing means includes a pair of guide rollers mounted adjacent the periphery of said rotatable disc between which said strip is fed to said mandrel, a press on lever pivotally mounted on said rotatable disc and having a roller thereon engageable with the strip material and spring means biasing said lever to cause said roller to press against said strip material on said mandrel.

5. Apparatus for producing a reinforced pipe, as claimed in claim 4, further comprising a pivot arm pivotally mounted to said rotatable disc, a roller rotatably mounted on said pivot arm movable radially against said coil mandrel, and spring means connected to said rotatable disc and said pivot arm for biasing said pivot arm to radially move said roller for engaging the reinforcement strip onto said coil mandrel.

6. Apparatus for producing a reinforced plastic pipe, as claimed in claim 5, wherein said means for feeding the tube comprises an extruder for extruding the tube, said extruder having an axis corresponding to the tube axis, and wherein said supply means comprising a rotatable drum rotatably mounted around said mandrel adjacent said extruder.

7. Apparatus for producing a reinforced plastic pipe, as claimed in claim 6, wherein said extruder includes an extruder die through which the tube is extruded, said mandrel being conical and embracing said die and being of a length equal to several turns of said reinforcement material and defining a thin annular gap with said die and terminating approximately in the discharge plane of said die.

8. Apparatus for producing a reinforced plastic pipe, as claimed in claim 7, wherein said reducing sleeve has an entrance through which the tube and the reinforcement coil is directed which is approximately in the discharge plane of the extruder.

9. Apparatus for producing a reinforced plastic pipe, as claimed in claim 1, wherein said tube feeding means comprises a device for forming said tube with a tacky surface so that it becomes welded to said strip.

10. Apparatus for producing a reinforced plastic pipe, as claimed in claim 1, wherein said reinforcement strip supply means comprises a rotatable drum having a coil of the reinforcement strip material thereon, said drum being concentrically arranged in respect to said mandrel and means mounting said drum for rotation about the axis of said mandrel.

11. Apparatus for producing a reinforced plastic pipe, as claimed in claim 1, wherein said reinforcement strip supply means comprises a rotatable drum, friction roller means rotatably supporting said drum for rotation thereon and a drive motor connected to said friction roller means to rotate said rollers to engage said drum to rotate said drum.

12. Apparatus for producing a reinforced plastic pipe, as claimed in claim 10, including a holder for said reducing sleeve extending through said supply drum, said reducing sleeve being fastened to said holder in a manner permitting its radial movement.

13. Apparatus for producing a reinforced plastic pipe, as claimed in claim 12, wherein said reducing sleeve has an axial diameter reduction extending over an axial length corresponding to the width of the reinforcement strip coil or to the pitch of a turn of the reinforcement strip coil.

14. Apparatus for producing a reinforced plastic pipe, as claimed in claim 1, wherein said mandrel has a conical outer generated surface tapering in an axial direction in the directions of movement of said tube.

15. Apparatus for producing a reinforced plastic pipe, as claimed in claim 14, wherein said mandrel is provided on its generated surface with an axial fluting.

* * * * *